(12) United States Patent
Dynys et al.

(10) Patent No.: US 6,679,961 B2
(45) Date of Patent: Jan. 20, 2004

(54) DIE PRESSING ARCTUBE BODIES

(75) Inventors: Frederick W. Dynys, Chagrin Falls, OH (US); Curtis Edward Scott, Mentor, OH (US)

(73) Assignee: General Electric Company, Schenectady, NY (US)

( * ) Notice: Subject to any disclaimer, the term of this patent is extended or adjusted under 35 U.S.C. 154(b) by 152 days.

(21) Appl. No.: 10/036,645

(22) Filed: Nov. 7, 2001

(65) Prior Publication Data

US 2002/0072462 A1 Jun. 13, 2002

Related U.S. Application Data

(62) Division of application No. 09/475,434, filed on Dec. 30, 1999, now Pat. No. 6,346,495.

(51) Int. Cl.$^7$ .............................................. B32B 31/26
(52) U.S. Cl. ..................... 156/89.11; 156/85; 156/245; 156/252
(58) Field of Search ..................... 156/89.11, 89.12, 156/85, 256, 257, 245, 252; 501/127

(56) References Cited

U.S. PATENT DOCUMENTS

| | | | |
|---|---|---|---|
| 4,285,732 A | | 8/1981 | Charles et al. |
| 4,545,799 A | * | 10/1985 | Rhodes et al. |
| 4,699,774 A | | 10/1987 | Prud' Homme Van Reine |
| 4,704,093 A | * | 11/1987 | Morris |
| 4,765,820 A | * | 8/1988 | Naganawa et al. |
| 5,096,862 A | | 3/1992 | Mathers et al. |
| 5,382,556 A | | 1/1995 | Takahashi et al. |
| 5,725,827 A | * | 3/1998 | Rhodes et al. |
| 5,727,975 A | * | 3/1998 | Wei et al. |
| 5,866,982 A | * | 2/1999 | Scott et al. |
| 6,027,389 A | * | 2/2000 | Miyazawa et al. |
| 6,126,887 A | * | 10/2000 | Ward et al. |
| 6,126,889 A | * | 10/2000 | Scott et al. |
| 6,294,871 B1 | * | 9/2001 | Scott et al. |
| 6,346,495 B1 | * | 2/2002 | Dynys et al. |
| 6,456,005 B1 | * | 9/2002 | Panchula et al. |
| 2002/0117784 A1 | * | 8/2002 | Neil et al. |
| 2002/0171363 A1 | * | 11/2002 | Scott et al. |

FOREIGN PATENT DOCUMENTS

| | | |
|---|---|---|
| EP | 0 587 238 A1 | 9/1993 |
| EP | 1 006 552 | * 6/2000 |
| JP | 10-106491 | * 4/1998 |

* cited by examiner

*Primary Examiner*—Curtis Mayes
(74) *Attorney, Agent, or Firm*—Fay, Sharpe, Fagan, Minnich & McKee, LLP

(57) ABSTRACT

A method of making a component of a ceramic discharge chamber comprising the steps of forming a ceramic composition including an aluminum powder, a binder and a grain growth inhibitor. The alumina powder has a tap density greater than 1.0 gram per cc. The ceramic composition is then die pressed to form a component preform. Next, the component preform is heated to remove at least a substantial portion of the binder.

7 Claims, 1 Drawing Sheet

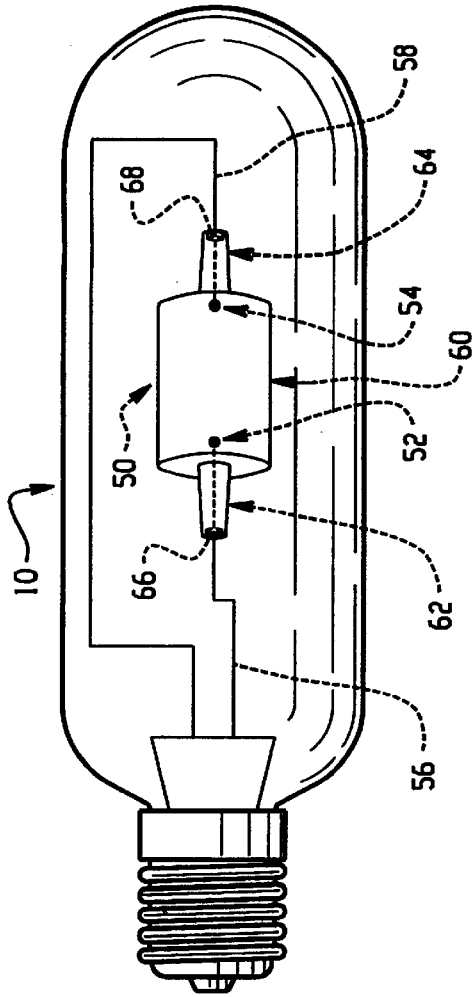
Fig. 1
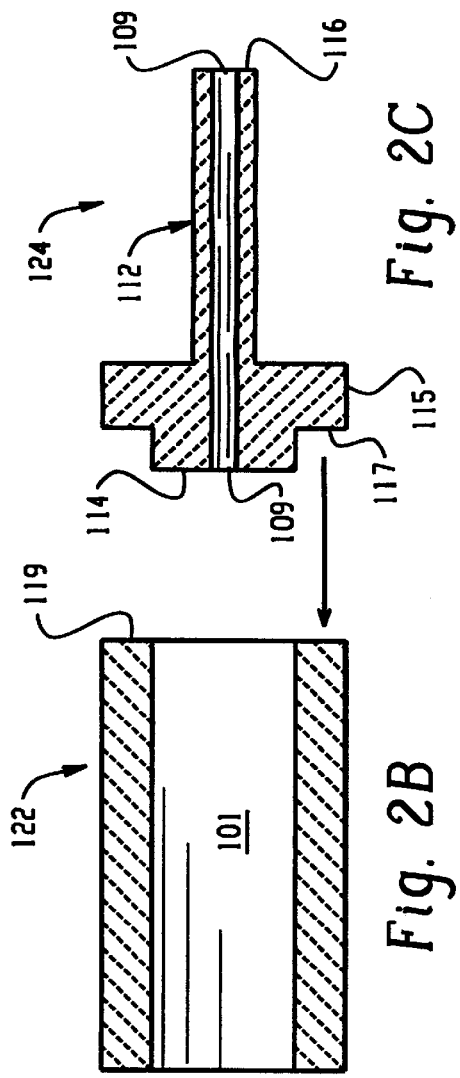
Fig. 2C
Fig. 2B
Fig. 2A

DIE PRESSING ARCTUBE BODIES

This application is a division of U.S. Ser. No. 09/475,434 filed Dec. 30, 1999, now U.S. Pat. No. 6,346,495.

BACKGROUND OF THE INVENTION

This invention relates generally to lighting and more particularly, to ceramic discharge chambers for a discharge lamp, such as a ceramic metal halide lamp or a high pressure sodium discharge lamp.

The present invention relates generally to lighting, and more specifically, to a ceramic arc chamber for a discharge lamp, such as a ceramic metal halide lamp. This invention relates particularly to a method of manufacturing ceramic arc chambers, and more particularly, to a method for forming ceramic arc chambers.

Discharge lamps produce light by ionizing a fill such as a mixture of metal halides and mercury with an electric arc passing between two electrodes. The electrodes and the fill are sealed within a translucent or transparent discharge chamber which maintains the pressure of the energized fill material and allows the emitted light to pass through it. The fill, also known as a "dose", emits a desired spectral energy distribution in response to being excited by the electric arc.

Previously, the discharge chamber in a discharge lamp was formed from a vitreous material such as fused quartz, which was shaped into a desired chamber geometry after being heated to a softened state. Fused quartz, however, has certain disadvantages which arise from its reactive properties at high operating temperatures. For example, at temperatures greater than about 950 to 1,000° C., the halide fill reacts with the glass to produce silicates and silicon halide, reducing the fill constituents. Elevated temperatures also cause sodium to permeate through the quartz wall. These fill depletions cause color shift over time, which reduces the useful life of the lamp.

Ceramic discharge chambers were developed to operate at high temperatures for improved color temperatures, color renderings, and luminous efficacies, while significantly reducing reactions with the fill material. U.S. Pat. Nos. 4,285,732 and 5,725,827, for example, disclose translucent polycrystalline sintered bodies where visible wavelength radiation is sufficiently able to pass through to make the body useful for use as an arc tube.

Typically, ceramic discharge chambers are constructed from a number of parts extruded or die pressed from a ceramic powder and then sintered together. For example, referring now to European Patent Application No. 0587238, five ceramic parts are used to construct the discharge chamber of a metal halide lamp. Two end plugs with a central bore are fabricated by die pressing a mixture of a ceramic powder and inorganic binder. A central cylinder and the two legs are produced by extruding a ceramic powder/binder mixture through a die. After forming the part, it is typically air sintered between 900–1400° C. to remove organic processing aids. Assembly of the discharge chamber requires tacking of the legs to the cylinder plugs, and the end plugs into the end of the central cylinder. This assembly is then sintered to form joints which are bonded by controlled shrinkage of the individual parts. Obviously, a simplified form of the product would be achieved by the reduction in the number of components separately formed. Moreover, the step of properly joining the compounds is time consuming, expensive and a potential point of failure.

Typically, ceramic discharge chambers are constructed from a number of parts extruded or die pressed from a ceramic powder. For example, end plugs with the central bore may be fabricated by die pressing a mixture comprising a ceramic powder and an organic binder. A central cylinder, and the two legs may be produced by extruding a ceramic powder/binder mixture through a die. Assembly of the discharge chamber involves the placement and tacking of the legs to the end plugs and the end plugs into the ends of the central cylinder. This final assembly is then sintered to form four centered joints which are bonded by controlled shrinkage of the individual parts. The conventional ceramic discharge chamber method of construction has a number of disadvantages. For example, the number of component parts is relatively large and introduces the corresponding number of opportunities for variation and defects. Also, the conventional discharge chamber includes four bonding regions, each of which introduces an opportunity for lamp failure by leakage of the fill material if the bond if formed improperly. Each bonding area also introduces a region of relative weakness, so that even if the bond is formed properly, the bond may break during handling or be damaged enough in handling to induce failure in operation.

Another disadvantage relates to the precision with which the parts can be assembled and the resulting effect in the light quality. It is known that the light quality is dependent to a substantial extent on the voltage across the electrode gap, which in turn is dependent on the size of the gap consistently achieve the gap size within an acceptable tolerance without significant effort devoted to optimizing the manufacturing process. Accordingly, it would be desirable to minimize the component parts necessary to manufacture the ceramic arc chamber. However, divergent shrinkage rates of variously shaped components and other factors have limited the ability to manufacture in a more efficient manner.

BRIEF SUMMARY OF THE INVENTION

According to an exemplary embodiment of the invention, a method is provided for making a component of a ceramic discharge chamber by forming a ceramic composition including a ceramic powder, a binder, and a grain growth inhibitor. The ceramic powder has a tap density of greater than about 1.0 gm per cc. The ceramic composition is then die pressed to form the desired ceramic discharge chamber preform component. The preform component can then be assembled with additional preform components into a presintered discharge chamber and sintered to join the components via controlled shrinkage.

The preform components of the present invention can facilitate the assembly of an arc discharge chamber from fewer components than demonstrated previously. Moreover, the present method allows intricate shaped components to be die pressed. More specifically, the end cap members can be die pressed in the shape of the disk shaped body and leg extension. This clearly provides a manufacturing simplicity versus conventional manufacturing steps which included the extrusion of leg portions which must then be secured to end caps or extensive machining.

Exemplary embodiments of the invention can be used to improve the performance of various types of lamps, such as metal halide metals, high pressure mercury vapor lamps, and high pressure sodium vapor lamps.

BRIEF DESCRIPTION OF THE DRAWINGS

Other features and advantages of the invention will be readily understood upon reading the following detailed description. in conjunction with the drawings, in which:

FIG. 1 illustrates a light source which includes a ceramic discharge chamber according to the exemplary embodiment of the invention; and FIGS. 2A–2C illustrate components of a discharge chamber for a metal halide lamp.

DETAILED DESCRIPTION OF THE PREFERRED EMBODIMENTS

FIG. 1 illustrates a discharge lamp 10 according to an exemplary embodiment of the invention. Discharge lamp 10 includes a discharge chamber 50 which contains two electrodes 52, 54 and fill material. Electrodes 52, 54 are connected to conductors 56, 58, which apply a potential difference across the electrodes. In operation, the electrodes 52, 54 produce an arc which ionizes a fill material to produce a plasma in the discharge chamber 50. The emission characteristics of the light produced by the plasma depend primarily on the constituents of the fill material, the voltage across the electrodes, the temperature distribution of the chamber, the pressure in the chamber, and the geometry of the chamber. For a ceramic metal halide lamp, the fill may typically comprise a mixture of Hg, a rare gas such as Ar or Xe and a metal halide such as NaI, TlI DyI$_3$. For high pressure sodium lamp, the fill material typically comprises sodium, a rare gas, and Hg. Other fill materials are also well known in the art, and the present invention is believed to be suitable for operation with any of those recognized ionizable materials.

As shown in FIG. 1, the discharge chamber 50 comprises a central body portion 60 and two leg portions 62, 64. The ends of the electrodes 52, 54 are typically located near the opposite ends of the body portion 60. The electrodes are connected to a power supply by the conductors 56, 58 which are disposed within a central bore of each leg portion 62, 64. The electrodes are typically comprised of tungsten. The conductors typically comprise niobium and molybdenum which have thermal expansion coefficients close to that of alumina to reduce thermally induced stresses on the alumina leg portion 62, 64.

The discharge chamber 50, is sealed at the ends of the leg portions 62, 64 with seals 66, 68. The seal 66, 68 typically comprise a disprosia-alumina-silica glass that can be formed by placing a glass frit in the shape of a ring around one of the conductors, eg. 56, aligning the discharge chamber 50 vertically and melting the frit. The melted glass then flows down into the leg 62, forming a seal between the conductor 56 and the leg 62. The discharge chamber is then turned upside down to seal the other leg 64 after being filled with the fill material.

The leg portion 62, 64, extends axially away from the center of the discharge chamber 50. The dimensions of the leg portions 62, 64 are selected over the temperature of the seal 66, 68 by desired amount with respect to the center of the discharge chamber 50. For example, in a 70 watt lamp, the leg portion portions have a length of about 10–15 mm, an inner diameter of 0.8–1.0 mm and an outer diameter of about 2.5–3.0 mm to lower the temperature at the seal 66, 68 to about 600 to 700° C., which is about 400° C. less than the temperature at the center of the discharge chamber. In a 35 watt lamp, the leg portions have a length of about 10–15 mm, an inner diameter of 0.7 to 0.8 mm and an outer diameter of about 2.0–2.5 mm. In a 150 watt lamp, the leg portions have a length of about 12–15 mm and an inner diameter of about 0.9–1.1 mm, and an outer diameter of about 2.5–3.0 mm. These dimensions, and others through the specification, are of course given as examples and are not intended to be limiting.

The body portion 60 of the discharge chamber is typically substantially cylindrical. For a 70 watt lamp, the body portion typically has an inner diameter of about 7 mm and outer diameter of about 8.5 mm. For a 35 watt lamp, the body portion typically has an inner diameter of about 5 mm and an outer diameter of about 6.5 mm. For a 150 watt lamp, the body portion typically has an inner diameter of about 9.5 mm and an outer diameter of 11.5 mm.

An exemplary embodiment of the invention is provided in FIGS. 2A, 2B and 2C, demonstrating a discharge chamber formed from three components. FIGS. 2A–2C illustrate components of a discharge chamber formed from three elements. In FIG. 2B, a body member 122 is shown which is substantially cylindrical. The body member 122 of FIG. 2B can be formed by injection molding, die pressing, or by any other technique known in the art. For example, the body member 122 can also be formed by extrusion. The composition used may comprise, for example, 75% by weight alumina powder, 22% by weight of water soluble polyacrylamide and 3% by weight of stearate. The alumina powder may also be doped with magnesia.

The leg member 124 is depicted which includes a leg portion 112 and a transition portion 114. Both the leg portion 112 and the transition portion 114 include a central bore 109 which houses one of the two electrodes and the conductor. Transition portion 114 may be generally in the form of a plug which fits inside the end of the body member 122. Transition portion 114 typically has a circumference which is greater than the circumference of the leg portion 112. Transition portion 114 typically includes a radially directed flange 115 which projects radially outwardly from transition portion 114. The radially directed flange 115 provides a shoulder 117 which rests against the end 119 of the body member 122 during assembly and fixes the relative axial position of leg member 124 with respect to the body member 122. "Axial" refers to an axis through the central bores 107, 109 in leg portions 112, 126. The radially directed flange 115 provides the advantage of the total length of the assembled discharge chamber, e.g. measured from the end 118 of leg member 120 to the opposite end 116 of leg member 124, to be maintained to within a tight dimensional tolerance. The total length of the discharge chamber typically effects the separation between the electrodes, since the electrodes are typically referenced to the ends 116, 118 of the leg portions, 120, 126 during assembly. For example, the conductor may be crimped at a fixed distance from the end of the electrode, which crimp rests against of the leg portion to fix the axial position of the electrode with respect to the leg portion. Because the axial position of the electrodes is fixed with respect to the leg portions, the separation of the electrodes is determined by the position of the leg member 124 with respect to the body member 122 which can be precisely controlled by the radially directed flange 115. The radially directed flange 115 thus allows the electrodes to be consistently positioned to have a precise separation distance, which provides consistency and quality of the light produced.

The leg members 120, 124 are constructed by die pressing a mixture of ceramic powder in a binder. Typically, the mixture comprises between about 80 and 99% by weight ceramic powder and about 1 and 20% by weight organic binder, preferably between about 95 and 98% and 2 and 5%, respectively. The ceramic powder may comprise alumina ($Al_2O_3$) having a purity of at least 99.98% and a surface area of about 2–10 meters squared per gram. The alumina powder will have a tap density greater than 1 g/cc. Alumina powder may be doped with magnesia to inhibit grain growth, for example in an amount equal to 0.03%–0.2%, preferably 0.05% by weight of the alumina. Accordingly, the present ceramic powder mixture allows die pressing of the complex leg member shape without tacking the leg to the body or extensive machining.

Other ceramic materials which may be used include non-reactive refractory oxides and oxynitrides such as yttrium oxide and hafnium oxide and compounds of alumina such as yttrium-alumina-garnet and aluminum oxynitride. Binders which may be used individually or in combination include organic polymers, such as polyols, polyvinyl alcohol, vinyl acetates, acrylates, cellulosics and polyesters.

Subsequent to formation, the binder is removed from the green part, typically by thermopyrollisis, to form a bisque-fired part. The thermopyrollisis may be conducted, for example, by heating the green part in air from room temperature to a maximum temperature from 900 to 1100° C. over 48 hours, then holding the maximum temperature from 1 to 5 hours, and cooling the part. After thermopyrollisis, the porosity of the bisque-fired part is typically about 40–50%. The bisque-fired part is then machined. For example, a small bore may be drilled along the axis of the solid cylinder which provides bore 107 in leg member 120. Next, a large diameter bore may be drilled along the portion of the axis to form the chamber 101. Finally, the outer portion of the originally solid cylinder may be machined away along part of the axis, for example, by lathe, to form an outer surface of leg portion 126. The machined parts are typically assembled prior to sintering to allow the sintering step to bond the parts together.

According to an exemplary method of bonding, the densities of the bisque-fired parts used to form the body member 122 and the leg members 120, 124 are selected to achieve different degrees of shrinkage during the sintering step. The different densities in the bisque-fired parts may be achieved by using ceramic powders having different surface areas. For example, the surface area of the ceramic powder used to form body member 122 may be 10–15 square meters per gram, while the surface area of the ceramic body used to form the leg members 120 and 124 may be 2–4 square meters per gram. The finer powder in the body member 122 causes the bisque-fired body member 122 to have a lower density than the bisque-fired leg members 120 and 124 made from the coarser powder. Because the bisque-fired body member is less dense than the bisque-fired leg members, the body portion shrinks to a greater degree (e.g., 3–10%) during sintering than the transition portion 114 to form a seal along transition portion 114.

The sintering step may be carried out by heating the bisque-fired parts in hydrogen having a dew point of about 10–15°. Typically, the temperatures increase from room temperature to about 1300° C. over a two hour period. Next, the temperature is held to about 1300° C. for about 2 hours. Next, the temperature is increased by about 100° C. per hour up to a maximum temperature of about 1850–1880° C. Next, the temperature is held at 1850–1880° C. for about 3.5 hours. Finally, the temperature is decreased from room temperature for two hours. The resulting ceramic material comprises densely sintered polycrystalline aluminum.

An exemplary composition which has been used for die pressing the leg members 120, 124, comprises 95% by weight alumina powder having a surface area of 3–5 meters squared per gram, available from Reynolds Chemicals, as product number RC-HPT. The alumina powder is preferably spray dried and is formed via dry milling. The alumina powder is typically doped with magnesia in the amount of 0–0.05% of the weight of the alumina. The composition also includes 4% by weight polyvinyl alcohol and 1% by weight Carbowax 600, available from Interstate Chemical.

The alumina powder or other ceramic of choice, will have a tap density greater than 1.0 gram per cc as defined by ASTM B527-93 (1997). More preferably, the tap density will be in the range of 1.2 to about 1.5 grams per cc. The resultant ceramic powder composition can be die pressed according to a fill ratio of at least about 1.8.

Die pressing at approximately 10,000 pounds per square inch is typically employed. Preferably, a Model 602 Double Action Press from Pentronix, Inc. may be used as the die pressing equipment.

Although the invention has been described with reference to exemplary embodiments, various changes and modifications can be made without departing from the scope and spirit of the invention. These modifications are intended to fall within the scope of the invention, as defined by the following claims.

What is claimed is:

1. A method of making a ceramic discharge chamber comprising the steps of:

forming ceramic compositions including a ceramic powder, a binder, and a grain growth inhibitor, said ceramic powder having a tap density greater than 1.0 gram per cc, die pressing a said ceramic composition to form a preform cylindrical ceramic body member, die pressing a said ceramic composition to form a preform leg member having a disc shaped body and an axially extending leg element, the ceramic compositions' densities for forming the body member and the leg member preforms being different from each other, machining said preform component to form a bore through said leg and said disc shaped body, positioning said preform leg member in an end of said cylindrical ceramic body member, and sintering the preforms to allow controlled shrinkage to join the leg member and the cylindrical ceramic body, the different densities in the leg and the body member causing a lesser shrinkage in the leg member and a greater shrinkage in the body member to form an enhanced seal.

2. The method of claim 1 wherein said grain growth inhibitor comprises magnesia.

3. The method of claim 1 wherein said binder is selected from the group consisting of organic polymers, polyvinyl alcohol, vinyl acetates, acrylates, cellulosics, polyesters and mixtures thereof.

4. The method of claim 1 wherein said preforms are heated to at least 900° C. before machining.

5. The method according to claim 1, wherein the ceramic powder of the ceramic composition for forming the cylindrical body member includes a surface area from 10 to 15 $m^2/g$, and for forming the leg member includes a surface area from 2 to 4 $m^2/g$.

6. A method of making a ceramic discharge chamber comprising:

forming a ceramic composition including a ceramic powder, a binder, and a grain growth inhibitor, the ceramic powder having a tap density greater than 1.2 grams per cc;

die pressing the ceramic composition to form a preform component having a disc shaped body and an axially extending leg element;

positioning said preform component in an end of a cylindrical ceramic body preform; and sintering the preforms to allow controlled shrinkage to join the preform component and the cylindrical ceramic body.

7. A method of making a ceramic discharge chamber comprising:

forming a ceramic composition including a ceramic powder, a binder, and a grain growth inhibitor, the ceramic powder having a tap density greater than 1.0 grams per cc;

die pressing the ceramic composition to form a preform component having a disc shaped body and an axially extending leg element, the die pressing is being performed according to a fill to die ratio of at least about 1.8; and positioning said preform component in an end of a cylindrical ceramic body preform, and sintering the preforms to allow controlled shrinkage to join the preform component and the cylindrical ceramic body.

* * * * *